United States Patent

[11] 3,557,849

| [72] | Inventor | Edwin O. Martinson<br>Milwaukee, Wis. |
|---|---|---|
| [21] | Appl. No. | 884,171 |
| [22] | Filed | Dec. 11, 1969<br>Division of Ser. No. 636,215, May 4, 1967,<br>Patent No. 3,516,462. |
| [45] | Patented | Jan. 26, 1971 |
| [73] | Assignee | Koehring-Waterous, Ltd.<br>Brantford, Ontario, Canada<br>a corporation of Canada. |

[54] TREE HARVESTER
4 Claims, 5 Drawing Figs.

[52] U.S. Cl. .................................................. 144/3,
214/3
[51] Int. Cl. ..................................................... A01g 23/02
[50] Field of Search........................................... 214/3;
144/2—(21), 3—(4), 34, 34(1—5), 309—(34)

[56] References Cited
UNITED STATES PATENTS

| 3,008,731 | 11/1961 | Bombardier................... | 144/34 |
| 3,059,677 | 10/1962 | Busch et al. .................. | 144/309 |
| 3,198,225 | 8/1965 | Busch........................... | 144/3 |

*Primary Examiner*—Gerald A. Dost
*Attorneys*—Charles W. Walton, F. Kristen Koepcke and Wenzel Zierold ABSTRACT: A tree-harvesting machine of the articulated vehicle type is equipped with a mechanism for advancing logs from the forward to the rearward vehicle unit and for automatically aligning the logs lengthwise with the rear vehicle unit when the units are in a relatively angled condition, as for steering.

PATENTED JAN 26 1971

INVENTOR
EDWIN O. MARTINSON

BY
ATTORNEY

TREE HARVESTER

This application is a division of application Ser. No. 636,215 filed on May 4, 1967, and now U.S. Pat. No. 3,516,462 by Edwin O. Martinson and Philip A. Huffaker for Method and Apparatus for Harvesting Trees.

The present invention relates to the harvesting of trees, and it is concerned more particularly with a mobile apparatus which will cut trees from the ground, process them into logs, and accumulate and carry a number of produced logs with it as the apparatus moves about in the harvesting area.

A tree-harvesting apparatus which operates in the mentioned manner has heretofore been suggested, and in such earlier apparatus front and rear vehicle units are coupled together by a flexible connection which permits relative horizontal angling of the two units for steering, and relative lateral rocking to accommodate irregularities of the ground contour which are encountered as the apparatus moves about in the stump area. The relative horizontal angling of the front and rear vehicle units, while highly desirable in an apparatus of this character, however, presents a problem with respect to the handling of the logs. The equipment for cutting trees from the ground and for processing them into logs is preferably arranged to turn with the front unit, and a receptacle for stacking the logs is preferably arranged to turn with the rear unit. When the logs are long, such as the usual 8 feet length in pulpwood harvesting, it is further desirable to them horizontally lengthwise on the rear unit so that they will extend fore and aft in the longitudinal direction of the latter. Such longitudinal placement of the logs becomes difficult under certain conditions, namely when the logs are delivered by the processing equipment lengthwise generally in the longitudinal direction of the front vehicle unit, and the latter is in a position of horizontal angular displacement relative to the rear vehicle unit. To provide for proper lengthwise stacking of the logs on the rear unit of an articulated tree-harvesting machine in which the logs are delivered lengthwise of the front unit, it has heretofore been necessary to keep the front and rear vehicle units in longitudinal alignment with each other during the log-stacking operation.

Generally, it is an object of the invention to provide an improved tree-harvesting apparatus in which logs are delivered lengthwise of a front vehicle unit and stacked on a rear vehicle unit which is connected with the front unit for horizontal angular adjustment into and out of longitudinal alignment therewith.

More specifically, it is an object of the invention to provide an improved tree-harvesting machine of the mentioned character which is equipped with a log storage receptacle on the rear vehicle unit, and with a log-straightening device which will present the rearwardly delivered logs squarely to the rear unit, that is, lengthwise in the longitudinal direction of the e rear unit, not only when the front and rear units are in longitudinal alignment for straight ahead driving but also when they are angularly displaced relative to each other for steering.

A further object of the invention is to provide a log-straightening device for a tree-harvesting apparatus of the above outlined character which will not only direct the logs from horizontally nonaligned into horizontally aligned positions relative to the rear vehicle unit, but which will also advance the logs, one by one, lengthwise on the rear vehicle unit and present them in fore and aft extending positions thereon preparatory to stacking.

These and other objects and advantages are attained by the present invention various novel features of which will become apparent from the description herein of a preferred embodiment of the invention and will be pointed out by the appended claims.

Referring to the accompanying drawings.

Figure 1:
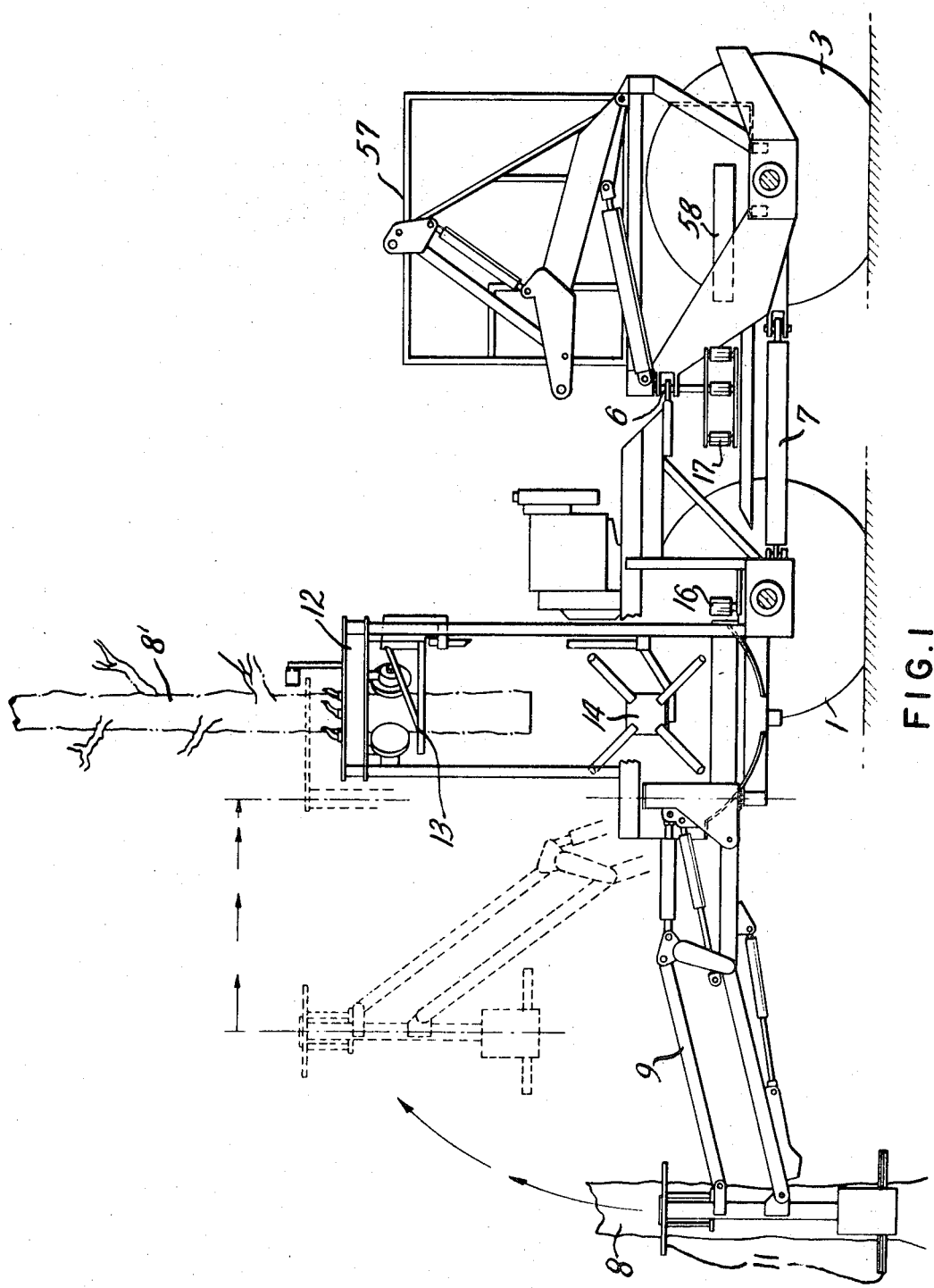
FIG. 1 is a somewhat schematic side view of a tree harvester embodying the invention.
Figure 2:
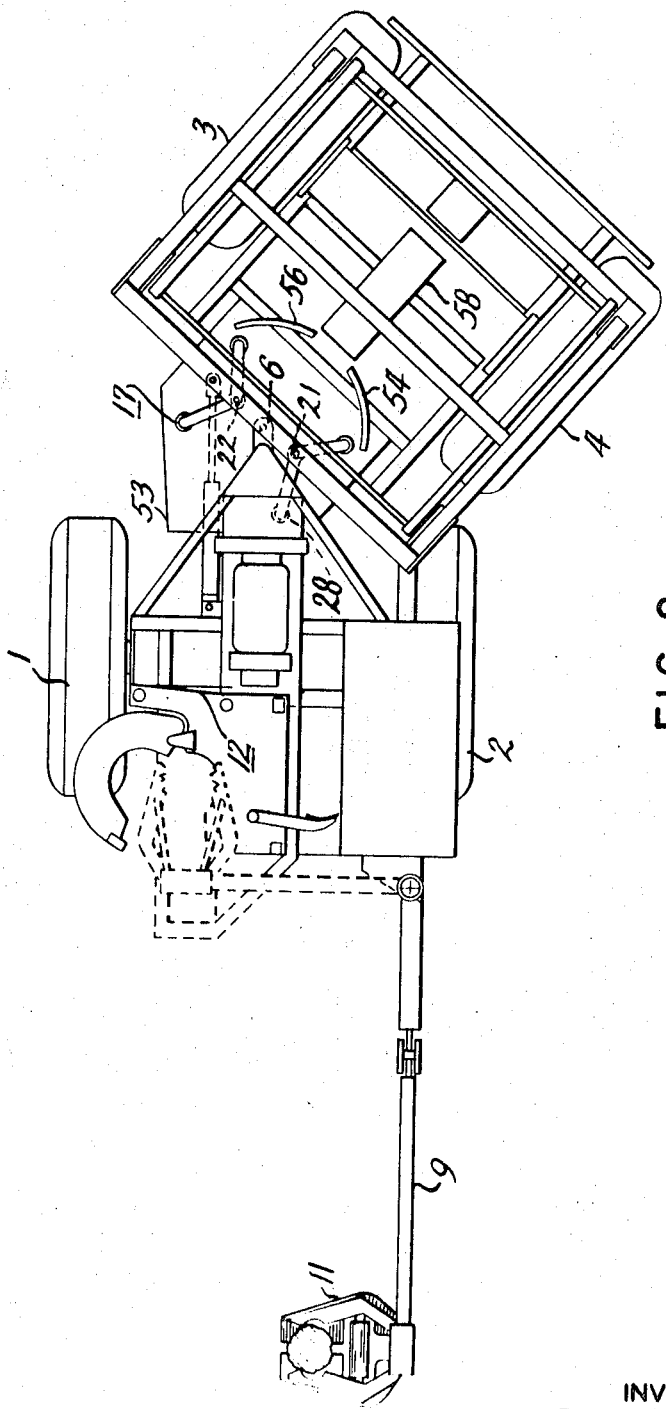
FIG. 2 is a top view of FIG. 1 but showing front and rear units of the apparatus in horizontally angled relation to each other for steering.

Generally, the apparatus shown in FIGS. 1 and 2 constitutes an articulated, self-propelled vehicle comprising a front unit s supported on right and left rubber tired power driven wheels 1 and 2, and a rear unit supported on right and left, rubber tired power driven wheels 3 and 4. A An upper swivel joint 6 and a lower drawbar 7 connect the frames of the front and rear units for relative pivotal and lateral rocking movement about the center of the swivel joint 6 and in vertically fixed relation to each other.

A tree selected for harvesting is indicated at 8 in its growth position, and the front vehicle unit is equipped to process the tree into logs of pulpwood length and to advance the logs horizontally lengthwise from the front unit in the longitudinal direction of the latter to the rear unit for storage thereon and transport to a desired place of delivery. The tree-processing equipment of the forward vehicle unit comprises a tree-hoisting boom 9 and associated tree-grapling and cutoff mechanism 11; a delimbing mechanism 12; a flying shear 13; a log-turning mechanism 14, and a log-feeding mechanism 16. Reference may be had to the mentioned parent application Ser. No. 636,215 for a fuller disclosure of the construction and operation of the several components of the front vehicle unit.

Briefly, the boom 9 and its associated grappling and cutoff mechanism 11 are adapted to cut a tree at its base while holding it against felling from its growth position, and to raise the cut tree to an elevated upright position as indict indicated by broken lines at 8'. The delimbing mechanism 12 then functions to progressively delimb the tree from its butt end upward while lowering it lengthwise from the elevated upright position. The flying shear 13 is operated during the downward movement of the tree to cut logs of pulpwood length from the delimbed trunk as it emerges from the underside of the delimbing mechanism 12. The log-turning mechanism 14 admits the descending delimbed tree trunk, and as soon as a log is severed therefrom by the flying shear 13, the mechanism 14 turns the severed log from its upright position below the residual upper portion of the tree into a horizontal position in which it is straddled by opposite feed rollers of the feed mechanism 16. Rotation of the feed rollers advances the horizontal long endwise into a log-straightening device 17 which is mounted on the rear vehicle unit.

Figure 3:
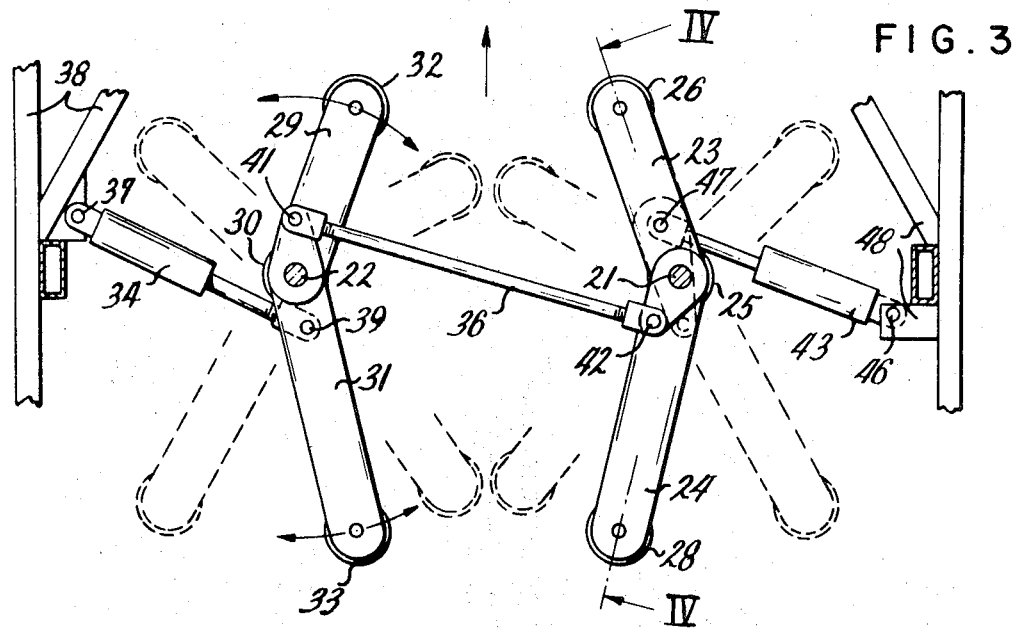
FIG. 3 is a schematic top view of a log-straightening device incorporated in the apparatus of FIGS. 1 and 2.
Figure 4:
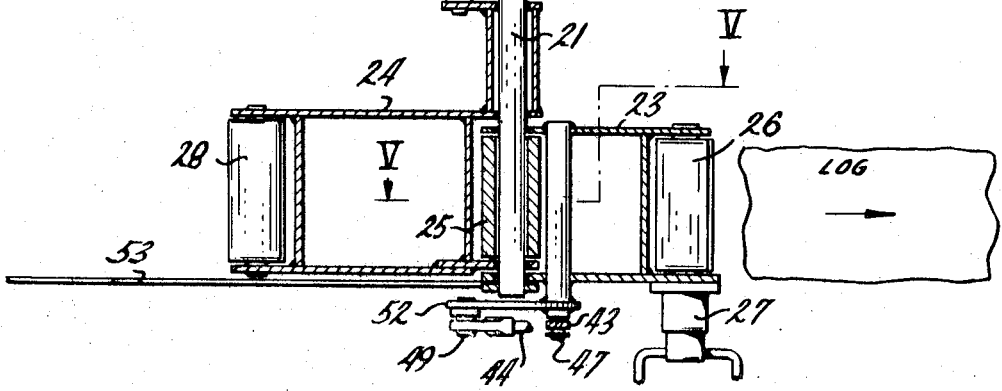
FIG. 4 is an enlarged sectional view on line IV—IV of FIG. 3.

The purpose of the log-straightening device 17 is to direct the logs which are advanced rearwardly by the feed mechanism 16 squarely upon the rear unit only only when the front and rear units are in longitudinal alignment for straight ahead driving as shown in FIG. 1, but also when they are angularly displaced about the center of the swivel joint 6 for steering as shown in FIG. 2. To that end, the log-straightening device 17 is constructed as follows:

Referring to FIGS. 2, 3 and 4, the frame of the rear vehicle unit comprises a forward horizontal cross tube 18 which has a hitch block 19 at its under side. The front vehicle unit is connected with the hitch block 19 by the swivel joint 6 (Fig. FIG. 1) and the log-straightening device comprises a vertical shaft 21 (FIG. 4) which is se secured at its upper end to the under side of the hitch block 19 and spaced transversely from the center of the swivel joint 6 at one side of the latter. Another vertical shaft 22 (FIG. 3) which is a duplicate of the shaft 21 depends from the under side of the hitch block 19 at the other side of the swivel joint 6 and at the same spacing therefrom as the shaft 21.

Pivotally mounted on the shaft 21 are two roller support arms 23, 24 which are swingable independently of each other about the shaft 21. Also mounted on the shaft 21 is an idler roller 25 (FIG. 4) which is rotatable independently of the arms 23, 24.

In the condition of the log-straightening device as shown in FIG. 3 the roller support arm 23 extends in a generally rearward direction, and the roller support arm 24 which is somewhat longer than the arm 23 extends in a generally forward direction from the shaft 21. A log-driving roller 26 is rotatably mounted on the free end of the short arm 23, and a hydraulic motor 27 (FIG. 4) at the under side of the arm 23 has a driving connection with the roller 26. An idler roller 28 is rotatably mounted at the free end of the log long arm 24.

Duplicates of the short and long arms 23, 24 are mounted on the shaft 22, and designated in FIGS. 3 and 4 by reference numerals 29 and 31, respectively. A log-driving roller 32 which is driven by another hydraulic motor is mounted on the free end of the short arm 29, and an idler roller 33 is rotatably mounted on the free end of the long arm 31. A center idler 30, corresponding to the center idler 25, is mounted on the shaft 22.

An actuating mechanism for the long arms 24, 31 (FIG. 3) comprises a double-acting hydraulic ram 34 and a link 36. The barrel of the ram 34 is connected by a vertical pivot pin 37 to a frame portion 38 of the rear vehicle unit. The piston rod of the ram 34 is connected by a pivot pin 39 to the arm 31 forwardly of the shaft 22, and the link 36 is connected at one end to a rearward extension of the arm 31 by a pivot a pin 41. The other end of the link 36 is connected to the long arm 24 forwardly of the shaft 21 by a pivot pin 42. Contraction and expansion of the ram 34 will move the long arms 24, 31 to diverging and converging limit positions, respectively, as show shown in dotted lines in FIG. 3.

Figure 5:
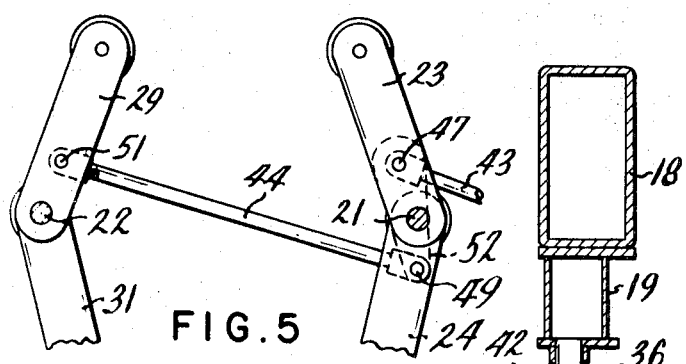
FIG. 5 is a view similar to FIG. 3 but taken on line V—V of FIG. 4.

The short arms 23, 29 are similarly actuated by a double-acting ram 43 (FIG. 3) and a link 44 (FIG. 5). Pivot pins 46, 47 connect the ram 43 with a frame portion 48 of the rear vehicle unit, and with the short arm 23, respective respectively. Pivot pins 49 and 51 (FIG. 5) connect the link 44 with a forward extension 52 of the arm 23, and with the arm 29, respectively. Contraction and expansion of the ram 43 will move the short arms 23 and 29 to diverging and converging limit positions, respectively, as shown in dotted lines in FIG. 3.

While a log is propelled rearwardly by the log-feeding mechanism 16 in FIG. 1, the rams 34 and 43 (FIG. 3) of the log-straightening device will be contracted so that the long arms 24, 31 as well as the short arm arms 23, 29 will be in their diverging limit positions as indicated in FIG. 2. A horizontal log advancing lengthwise to the rear in the longitudinal direction of the forward vehicle unit may therefore readily enter into the transverse space between the idler rolls on the shafts 21, 22 of the rear vehicle unit, regardless of whether the front and rear vehicle units are in longitudinal alignment with each other or whether they are angularly displaced, as for steering, about the center of the swivel joint 6. A horizontal guide plate 53 (FIGS. 2 and 4) is rigidly secured to the rear vehicle frame below the log-straightening device 17 in order to guide a rearwardly moving log horizontally into the open log-straightening device. Arcuate log stops 54 and 56 (FIG. 2) are rigidly mounted on the rear vehicle frame to limit rearward movement of a log entering obliquely into the space between the idlers on shafts 21, 22.

After a rearwardly moving log has cleared the drive rolls of the log-feeding mechanism 16 (FIG. 1), the rams 34 and 43 may be synchronously expanded so as to bring the rotating drive rollers 26, 32 and the idling rollers 28, 33 laterally against the rearwardly moving log. Such closing of the log straightening device will bring any obliquely positioned log between the idler rolls 25, 30 on the shafts 21, 22 into lengthwise alignment with the rear vehicle unit in the longitudinal direction of the latter. The drive rollers 26 and 32 on the short arms 23, 29 may be driven continuously so as to propel the straightened logs, one by one, lengthwise on the rear vehicle unit and present them in fore and aft extending position preparatory to stacking in a hopper generally designated in FIG. 1 by the reference numeral 57.

The hopper 57 has a bottom opening, and a mechanism, generally indicated in FIGS. 1 and 2 at 58, is provided on the rear vehicle unit for receiving successive logs delivered by the log-straightening device, lifting them through the bottom opening of the hopper, storing them in the hopper, and unloading the hopper after a desired number of logs have been accumulated therein. For a fuller explanation of the construction of the hopper and of its associated log loading and unloading equipment reference may be had to the above mentioned parent application.

In general f terms, the log-feeding device 16 (FIG. 1) represents log transfer means which are operable to advance a log lengthwise in the longitudinal direction of the front vehicle frame toward the rear vehicle frame; and the log-straightening device comprises relatively opposed log-engaging elements or guide members 26, 28 and 32, 33 and associated actuating means 34, 43 which are operable to widen the relative spacing of the log guide members for t straddling a log, and to shorten such spacing for bringing an oblique log into lengthwise alignment with the rear vehicle frame.

I claim:

1. In a tree-harvesting apparatus, the combination of wheeled, pivotally interconnected front and rear vehicle frames; tree-processing means mounted on said front frame and including log transfer means operable to advance a horizontally positioned log lengthwise in the longitudinal direction of said front frame toward said rear frame; and a log-straightening device comprising relatively opposed guide members mounted on said rear frame for horizontal transverse reciprocating movement relative to each other and in horizontally straddling relation to a log advanced rearwardly by said transfer means; and actual actuating means for said guide members selectively operable to widen and shorten the space therebetween; whereby said rearwardly advanced log am may be accommodated between said guide members and turned into lengthwise longitudinal alignment with said rear frame while the latter is out of longitudinal alignment with said front frame.

2. A tree-harvesting apparatus as set forth in claim 1, wherein said log-straightening device comprises a forward and a rearward log-engaging element mounted on said rear frame for horizontal swinging movement on a first common axis, another forward and another rearward log-engaging element mounted on said rear frame for horizontal swinging movement on a second common axis spaced transversely from said first axis, and actuating means for said forward and rearward log-engaging elements operable selectively to either swing said forward log-engaging elements and said rearward log-engaging elements synchronously apart, or to swing said forward and said rearward log-engaging elements synchronously together.

3. A tree-harvesting apparatus as set forth in claim 2 wherein power driven log-feeding rollers are mounted on one pair of said log-engaging elements.

4. In a tree-harvesting apparatus, the combination of wheeled front and rear vehicle units connected for horizontal angular adjustment into and out of longitudinal alignment with each other; tree-processing means mounted on said front vehicle unit including log transfer means successively operable to direct logs from an upstanding position rearwardly into a generally horizontal position lengthwise of said front unit; and log-straightening means mounted on said rear unit and operable to move said horizontal logs into lengthwise longitudinal alignment with said rear unit irrespective of whether said front and rear units are angularly adjusted horizontally into or out of longitudinal alignment with each other.